(12) United States Patent
Xia et al.

(10) Patent No.: US 11,449,193 B2
(45) Date of Patent: Sep. 20, 2022

(54) METHOD AND DEVICE FOR DISPLAYING A PROMPTING MESSAGE, MOBILE TERMINAL AND STORAGE MEDIUM

(71) Applicant: BEIJING XIAOMI MOBILE SOFTWARE CO., LTD., Beijing (CN)

(72) Inventors: Yuhang Xia, Beijing (CN); Yihong Zhang, Beijing (CN); Shaohua Hao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,521

(22) Filed: Nov. 29, 2019

(65) Prior Publication Data

US 2020/0409534 A1    Dec. 31, 2020

(30) Foreign Application Priority Data

Jun. 27, 2019   (CN) .......................... 201910570526.6

(51) Int. Cl.
G06F 3/04817   (2022.01)
H04M 1/724    (2021.01)
G06F 3/04842   (2022.01)

(52) U.S. Cl.
CPC ...... *G06F 3/04817* (2013.01); *G06F 3/04842* (2013.01); *H04M 1/724* (2021.01)

(58) Field of Classification Search
CPC .. G06F 3/048; G06F 3/04817; G06F 3/04842; H04M 1/00; H04M 1/724; H04L 51/24
See application file for complete search history.

(56) References Cited

U.S. PATENT DOCUMENTS 9,237,119 B1    1/2016   Dyball
9,535,571 B2 *  1/2017   Kim ................... G06F 3/04817
9,830,332 B1   11/2017   Dyball
(Continued)

FOREIGN PATENT DOCUMENTS

| CN | 104967644 A | 10/2015 |
| CN | 105337844 A | 2/2016 |
| CN | 107592406 A | 1/2018 |
| CN | 108347704 A | 7/2018 |
| CN | 109634479 A | 4/2019 |

OTHER PUBLICATIONS

Michael Lubrano: "Surface 3 With Windows 10", Sep. 5, 2015 (Sep. 5, 2015), p. 1, XP054980523, Retrieved from the Internet: URL: https://www. youtube. com/watch? v= RJ smlw sg hk[ retrieved on Jun. 4, 2020]* 4:00-7:45 *.

(Continued)

*Primary Examiner* — Jennifer N Welch
*Assistant Examiner* — Qi Wan
(74) *Attorney, Agent, or Firm* — Syncoda LLC; Feng Ma

(57) ABSTRACT

A method for displaying a prompting message includes that: upon there is a prompting message to be displayed, a first mark is dynamically displayed on a desktop; after an input operation for the first mark is detected, the desktop is switched to a prompting page; and the prompting message is displayed on the prompting page. Therefore, displaying of the prompting message is optimized, a user can view the prompting message in a more timely manner, and user experience is improved.

18 Claims, 9 Drawing Sheets

(56) References Cited

U.S. PATENT DOCUMENTS

| | | | |
|---|---|---|---|
| 2006/0212830 A1* | 9/2006 | Fogg | G06Q 10/107 715/835 |
| 2007/0136686 A1* | 6/2007 | Price | G06F 3/038 715/808 |
| 2007/0245269 A1* | 10/2007 | Kim | G06F 3/0488 715/856 |
| 2009/0241062 A1* | 9/2009 | Lin | H04N 5/445 715/810 |
| 2009/0305732 A1* | 12/2009 | Marcellino | H04L 51/24 455/466 |
| 2013/0254714 A1* | 9/2013 | Shin | G06F 3/0488 715/810 |
| 2013/0290902 A1* | 10/2013 | Martin | D06F 34/28 715/823 |
| 2013/0332886 A1* | 12/2013 | Cranfill | G06F 3/04817 715/835 |
| 2014/0149884 A1* | 5/2014 | Flynn, III | H04L 51/046 715/752 |
| 2015/0007048 A1* | 1/2015 | Dumans | G06F 3/04817 715/752 |
| 2015/0080058 A1* | 3/2015 | Rhee | G06F 3/04817 455/566 |
| 2015/0345068 A1* | 12/2015 | Coffman | G06F 3/0482 715/771 |
| 2020/0371667 A1* | 11/2020 | Chen | G06F 3/0482 |

OTHER PUBLICATIONS

Karon Asadi: Windows 10 The Complete Manual, Jan. 1, 2016 (Jan. 1, 2016), XP055701033, ISBN: 978-1-78546-456-0 Retrieved from the Internet: URL: https://www. zinio. com/GB/windows-10-th e-complete-manual/windows-1 0-the-complete-manual-i305434[ retrieved on Jun. 4, 2020]the whole document *.

Mark Klein: "How to Use and Configure the New Notification Center in Windows 10", Jul. 28, 2015 (Jul. 28, 2015), XP055701098, https://www. howtogeek. com/223503/how-to-us e-and-configure-the-new-notification-cente r-in-windows-10/Retrieved from the Internet: URL: https://web. archive. org/web/20161114034026/http:// ww. howtogeek. com: 80/223503/ho w-to-use-and-configure-the-new-notificatio n-center-in-windows-10/[ retrieved on Jun. 4, 2020]* the whole document *.

European Search Report in the European application No. 19215571. 1, dated Jun. 17, 2020.

Joan Lambert et el, "Windows 10 Step by Step", http://ptgmedia. pearsoncmg.com/images/9780735697959/samplepages/ 9780735697959.pdf, Dec. 31, 2015.

Office Action of the Indian application No. 201944051433, dated Mar. 13, 2021.

First Office Action of the Chinese application No. 201910570526.6, dated Dec. 14, 2021.

Second Office Action of the Chinese application No. 201910570526. 6, dated Jul. 5, 2022.

* cited by examiner

METHOD AND DEVICE FOR DISPLAYING A PROMPTING MESSAGE, MOBILE TERMINAL AND STORAGE MEDIUM

CROSS-REFERENCE TO RELATED APPLICATION

This application claims priority to Chinese patent application No. 201910570526.6 filed on Jun. 27, 2019, the disclosure of which is hereby incorporated by reference in its entirety.

BACKGROUND

Along with development of electronic technologies, more and more services can be provided by a mobile terminal. For example, a mobile terminal may be used for basic communications, socialization, shopping and reservation of various types of online or offline service, and may also be used for reading news and the like.

SUMMARY

The present disclosure generally relates to the technical field of electronics, and more specifically to a method and device for displaying a prompting message, a mobile terminal and a storage medium.

According to a first aspect of embodiments of the present disclosure, a method for displaying a prompting message is provided, which may include that:

upon there is a prompting message to be displayed, a first mark is dynamically displayed on a desktop;

after an input operation for the first mark is detected, the desktop is switched to a prompting page; and the prompting message is displayed on the prompting page.

According to a second aspect of the embodiments of the present disclosure, a device for displaying a prompting message is provided, which may include:

a processor; and a memory configured to store an instruction executable for the processor, wherein the processor is configured to:

upon there is a prompting message to be displayed, control dynamically displaying of a first mark on a desktop;

after an input operation for the first mark is detected, switch the desktop to a prompting page; and control displaying of the prompting message on the prompting page.

According to a third aspect of the embodiments of the present application, a non-transitory computer-readable storage medium is provided, which can have instructions stored thereon for execution by a processor of a mobile terminal to enable the mobile terminal to implement the method in any abovementioned technical solution.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1A:
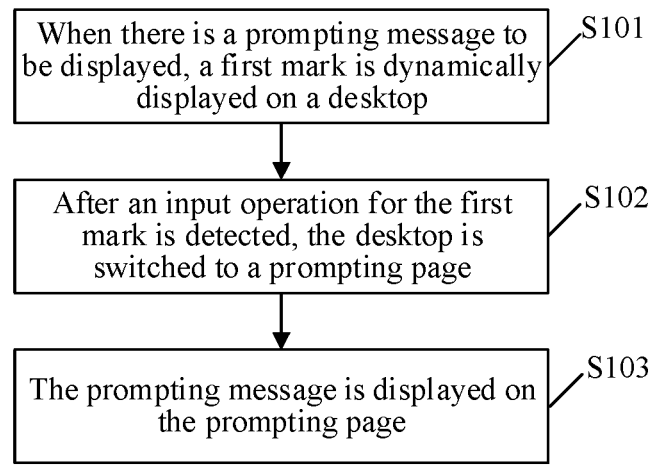
FIG. 1A is a flowchart illustrating a method for displaying a prompting message according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Terms used in the present disclosure are only adopted for the purpose of describing specific embodiments and not intended to limit the present disclosure. "A/an" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms "first," "second," "third" and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, the term "if" used here may be explained as "while" or "when" or "responsive to determining", which depends on the context.

A commonly used prompting manner is that if various applications are installed in a mobile terminal and when any one of these applications receives new messages, the number of messages of the application to be read is presented by a red number as a mark. Such a prompting manner sometimes cannot attract a user's attention to the new messages and brings a less clean desktop to the electronic device. For some users, it appears unfriendly to them to directly mark the number of messages to be read at an application icon.

Another manner of prompting is that a prompt is given through a system information bar. In this case, a user is required to pull down the system information bar where a notification center is presented, and multiple system messages to be read are presented in the notification center in an overlapping manner. In such a prompting manner, a user may completely forget reading messages sometimes and miss important messages accordingly.

As shown in FIG. 1A, some embodiments of the present disclosure provide a method for displaying a prompting message, which may include the following operations.

In operation S101, upon there is a prompting message to be displayed, a first mark is dynamically displayed on a desktop.

In operation S102, after an input operation for the first mark is detected, the desktop is switched to a prompting page.

In operation S103, the prompting message is displayed on the prompting page.

The method for displaying a prompting message as provided in the embodiment may be applied to various terminal devices, for example, a mobile terminal. The mobile terminal may include, but not limited to, a mobile phone, a pad or a wearable device, etc.

In the embodiment, the prompting message to be displayed may be a prompting message needed to be viewed by a user.

The prompting message may include, but not limited to, at least one of:

a calendar prompt, for example, a meeting calendar and a travel calendar;

an email prompt, for reminding that there is a new email to be viewed;

an instant message prompt, for reminding that there is a new instant message to be viewed; or a prompt of a dynamic update of reserved service, for reminding a user of a latest situation of the reserved service, wherein the reserved service may be determined based on a user setting or may be an important message automatically recognized based on an operating system, for example, the reserved service may include repayment service of a bank, online shopping service which is adding goods to a shopping cart, and etc., and the reserved service may also include express receiving service and/or express sending service, and an update service of a reservation application, for example, a reminder service of a stock application about volatility of a specific stock or index.

In a word, in the embodiment, the prompting message may remind a user of all contents or specific content needed to be viewed, which is only exemplarily described above and may be set according to a user requirement during specific implementation.

The desktop may be a page for displaying a file icon, and/or a folder icon, and/or a tool icon of a service provision tool. For example, the service provision tool may include, but not limited to, a tool capable of providing local service or cloud service, such as an application or an applet.

Figure 2:
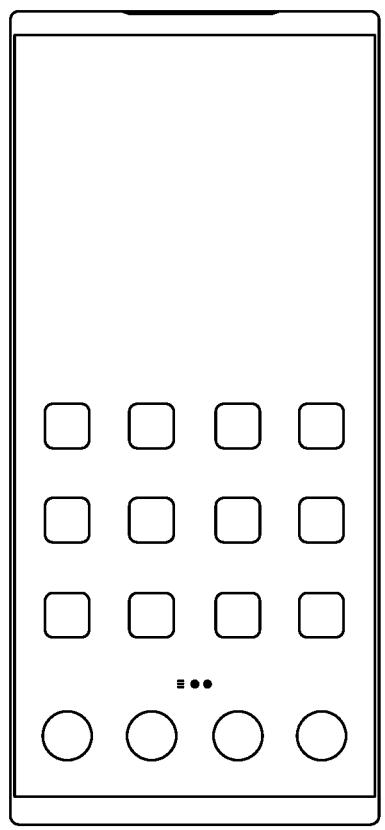
FIG. 2 is a schematic diagram illustrating a display effect of a desktop according to some embodiments of the present disclosure.

FIG. 2 shows a desktop where multiple application icons are displayed in parallel.

The first mark may be dynamically displayed on the desktop when there is a prompting message to be displayed, and the first mark may include a first icon and/or a first word. Under some circumstances, the first mark may solely be an icon or a word, or may be a combination of the icon and the word. For example, "new situation" is displayed as the first icon.

In the embodiment, dynamically displaying the first mark refers to that a display form and/or a display effect parameter of the first mark may change during displaying of the first mark, and thus the effect of the displaying may be switched between at least two different display effects.

For example, if the first mark is the first icon and when the first icon is dynamically displayed, the first icon has different display forms at different times, or, the first icon has the same display form but different display colors, different display brightness or different display transparency at different times, and thus a dynamic effect may be presented.

In the embodiment, the first mark is displayed at a blank position where the tool icon of the service provision tool such as an application icon is not displayed. An application icon on the desktop is usually statically displayed while the first mark is dynamically displayed, the attention of a user may be attracted by the dynamic effect, so that the user may timely operate the first mark and timely view the prompting message needed to be viewed.

In operation S102, upon when an input operation of a user for the first mark is detected, a display screen of the mobile terminal is switched from the desktop to the prompting page.

Various prompting messages needed to be viewed by the user are displayed on the prompting page, and the prompting messages may be displayed as a prompting card at different positions of the prompting page. For example, various service cards for providing reminder service are displayed on the prompting page, or, message cards which remind the user of viewing prompting messages are directly displayed.

Upon when an upward and downward sliding operation is detected on the prompting page, the prompting page may be slid up and down, and thus display cards displayed at different positions of the prompting page may be displayed on the screen.

In some embodiments, upon when a triggering operation over a display card is detected, the mobile terminal may, based on the triggering operation, enter a page of a service provision tool, such as an application or applet, associated with the prompting message displayed through the display card, so as to make it convenient for the user to process the page. Upon when the triggering operation is detected, it means that processing has been completed and it is unnecessary to display the prompting message anymore, the mobile terminal then may automatically remove the prompting message from prompting messages to be displayed, and the prompting message may be not displayed on the prompting page anymore.

In some other embodiments, the service card may be a message needed to be viewed by a user, for example, a short message, an instant message or an email content. Upon when the short message, the instant message or the email content is displayed on the display screen, the corresponding prompting message may be removed from the prompting messages to be displayed, and may be not displayed on the prompting page anymore.

In some embodiments, the operating system of the mobile terminal may send a notification to the service provision tool such as a local application or applet through an interface such as an Application Programming Interface (API), so that the service provision tool may know that the corresponding message has been viewed or processed. For example, upon when the prompting page indicates that an instant message needed to be viewed has been viewed, a notification is sent to an application corresponding to the instant message to notify the application of that the instant message has been viewed, then the application may remove a mark indicative of the message to be processed or to be displayed. Therefore, repeated prompting is reduced, and intelligence of the device and user satisfaction may be improved.

Figure 3A:
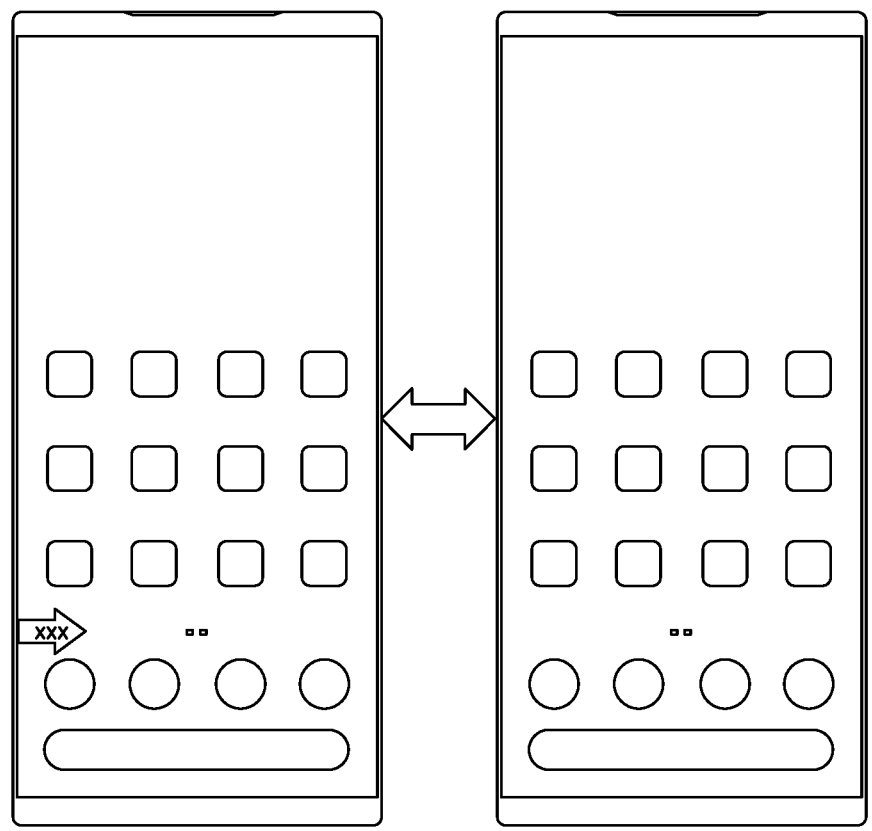
FIG. 3A is a schematic diagram illustrating a dynamic display effect of a first mark according to some embodiments of the present disclosure.

FIG. 3A is a schematic diagram illustrating a dynamic display effect of a first mark that is dynamically displayed. It may be seen from FIG. 3A that icons on a right side of the desktop are displayed or not displayed by extension and contraction changes, and the dynamic display effect is also achieved by switching between displaying and no displaying.

Figure 3B:
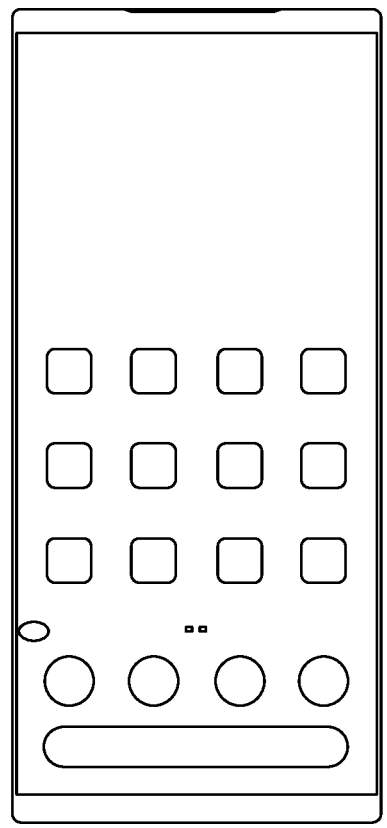
FIG. 3B is a schematic diagram illustrating a static display effect of a second mark according to some embodiments of the present disclosure.

FIG. 3B is a schematic diagram illustrating a display effect of a second mark that is statically displayed. It may be seen from comparison between FIG. 3 and FIG. 4 that the first mark is different from the second mark.

Figure 4A:
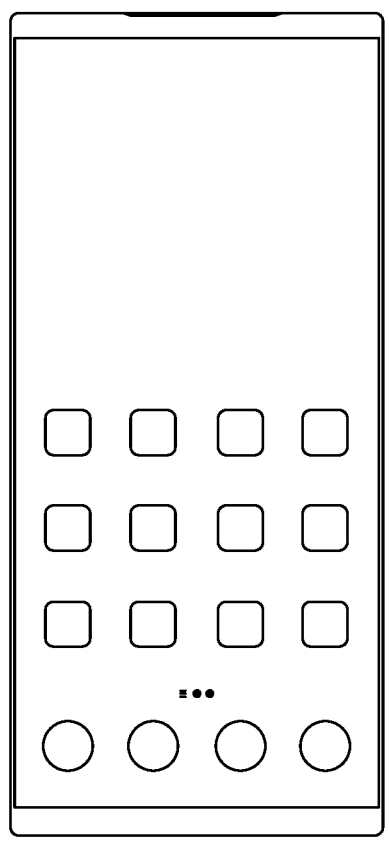
FIG. 4A is a schematic diagram illustrating a static display effect of a second mark according to some embodiments of the present disclosure.

FIG. 4A shows the second mark that is statically displayed. The second mark in FIG. 4A is one of three black dots displayed between round icons and rectangular icons.

Figure 4B:
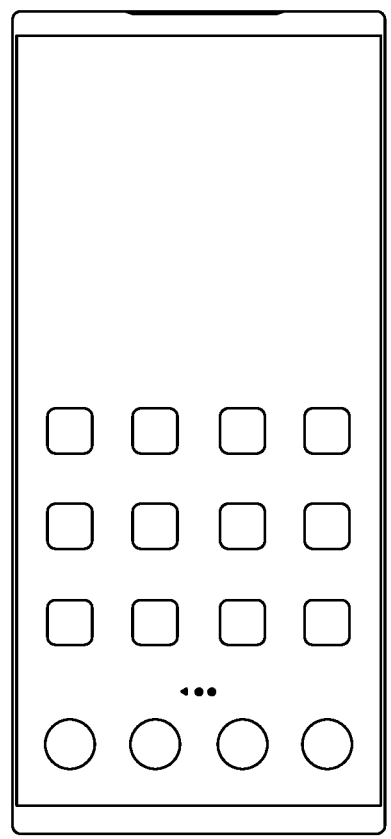
FIG. 4B is a schematic diagram illustrating a dynamic display effect of a first mark according to some embodiments of the present disclosure.

FIG. 4B shows the first mark that is dynamically displayed and indicates a direction. The second mark in FIG. 4B is a small triangle displayed between round icons and rectangular icons, and a direction that the small triangle transversely points to is a switching direction from the desktop to the prompting page.

In some embodiments, the first mark indicative of direction may indicate the direction by marking the status of the first mark or indicate the direction through a dynamic effect. For example, when the first mark is one or more arrows pointing to the same direction, the direction that the one or more arrows point to is consistent with the direction from the prompting page to the desktop. That is, the direction that the one or more arrows point to is opposite to the direction from the desktop to the prompting page. For another example, when the first mark is not an icon such as an arrow and/or a word, a changed direction of the dynamic effect is the indicated direction; and when the prompting page is on a left side of the desktop, the dynamic effect is presented on a left side of the first mark and then gradually moves to a right side. In such case, a changed direction of the dynamic effect is consistent with the direction from the prompting page to the desktop.

Accordingly, the user is prompt through the first mark how to operate, and thus user experience is further improved. Therefore, in some embodiments, the operation that the first mark is dynamically displayed on the desktop may include at least one of the following operations: when the prompting page is on a first side of the desktop, the first mark pointing to a second side of the desktop is displayed on the desktop, the second side being a side opposite to the first side.

Specifically, the icon may be a directional icon, and the icon may point to the desktop from the prompting page or may point to the prompting page from the desktop, so that a user may determine a relationship between the prompting page and the desktop according to the directional icon to know how to operate the device to switch the device from the desktop to the prompting page.

In some embodiments, at least one of the first mark or the second mark may be displayed at an edge position of the desktop or a middle position of the desktop.

The edge position of the desktop may include, but not limited to, a left edge of the desktop, a right edge of the desktop, a bottom edge of the desktop or a top edge of the desktop. For example, a region at a predetermined distance away from an edge line of the rectangular desktop is set to be an edge region, and the edge position of the desktop may be any position in the edge region of the desktop.

The middle position of the desktop may include, but not limited to, a position outside a region with the edge position.

In some embodiments, the state that the first mark is displayed at the middle position of the desktop may include that the first mark is displayed in a dock bar of the desktop.

In the embodiment, the dock bar may be a display region at a bottom of the desktop, and the display region may be divided from other regions above the bottom through a dividing line. In terms of displaying, upon when the display region other than the region of the desktop is swiped, the display screen may be switched to different desktops, while the dock bar is not switched in the display region other than the dock bar.

A plurality of display positions are set in the dock bar, and a tool icon of a service tool may be displayed at a display position. For example, an application icon may be displayed at a display position.

In some embodiments, when the extension and contraction change is made to the first mark in the first direction, the first mark is displayed at the edge position of the desktop.

When the extension and contraction change is made to the first mark in the second direction, the first mark is displayed in a middle region of the desktop.

In some embodiments, S101 may include that:

when there is a prompting message to be displayed, an extension and contraction change is made to the first mark on the desktop in a predetermined direction.

If the extension and contraction change is made to the first mark, the first mark is different at least in a display length in the predetermined direction at different time. For example, in a case that the first mark is one or more arrows and that the extension and contraction change is made to the one or more arrows in the predetermined direction, a length of the one or more arrows may change in the predetermined direction.

Here, the first mark not only has an effect of reminding the user that there is a prompting message to be displayed but also can prompt the user how to trigger the mobile terminal to switch from the desktop to the prompting page.

The predetermined direction may include any one of two opposite directions.

Specifically, the predetermined direction is:

a first direction, which is a direction from the prompting page to the desktop;

or, a second direction, which is a direction from the desktop to the prompting page.

In an example that the prompting page is at an edge of the desktop, the arrow shown in FIG. 3A is a first mark pointing to the first direction, and the small triangle shown in FIG. 4B is a first mark pointing to the second direction.

In some embodiments, the first direction may be a sliding direction of a sliding operation of triggering the electronic device to switch from the desktop to the prompting page.

For example, rightward extension and contraction of the arrow icon acting as the first mark pointing to the first direction is equivalent to prompting the user to slide rightward to switch the mobile terminal from the desktop to the prompting page.

In some embodiments, the method further may include that:

a position relationship between the prompting page and the desktop is determined; and the predetermined direction is determined according to the position relationship.

In some embodiments, when the mobile terminal displays the desktop, the prompting page is hidden at different positions of the desktop. In the embodiment, the predetermined direction may be determined according to the position relationship.

The position relationship matches with positions of the desktop and the prompting page in a switching queue.

For example, a first queue is set in the mobile terminal, and the first queue stores information of different desktop pages of the desktop. A second queue is also set in the mobile terminal, and the second queue stores an identifier of the desktop and an identifier of the prompting page. Upon when the input operation over the first mark is detected, the mobile terminal may perform display switching according to the second queue. In the second queue, when the identifier of the prompting page is on the left of the identifier of the desktop, a rightward sliding operation may switch the mobile terminal from the desktop to the prompting page, and in such case, the predetermined direction is rightward. When the identifier of the prompting page is on the right of the identifier of the desktop, a leftward sliding operation may switch the mobile terminal from the desktop to the prompting page, and in such case, the predetermined direction is leftward.

In some embodiments, the method further may include that:

a display position of the first mark is determined according to the position relationship; and S101 may further include that:

when there is a prompting message to be displayed, the first mark is dynamically displayed at the display position on the desktop.

In the embodiment, the display position of the first mark is also related to the position relationship. For example, when the prompting page is on the left of the desktop, the first mark may be displayed at the right edge of the desktop; and when the prompting page is at a bottom edge of the desktop, the first mark is displayed at the bottom of the desktop.

In the embodiment, the display position of the first mark is related to the position relationship, so that high adaptability to the habit of the user is achieved, and display friendliness of the mobile terminal is improved.

In some embodiments, there may be one or multiple prompting pages.

One such prompting page may be used to display prompting messages for one or more applications. When prompting messages of multiple applications are displayed on the same prompting page, the number of prompting pages is reduced and user operations are simplified, so that the user may completely view various prompting messages on the same prompting page and thus missed prompting messages are reduced.

In some embodiments, based on a prompting-message-based prompting method, when there is no prompting message to be displayed, a mark related to the prompting message may be not displayed, so that changes in desktop displaying are reduced, and high compatibility with the conventional art is achieved.

Figure 1B:
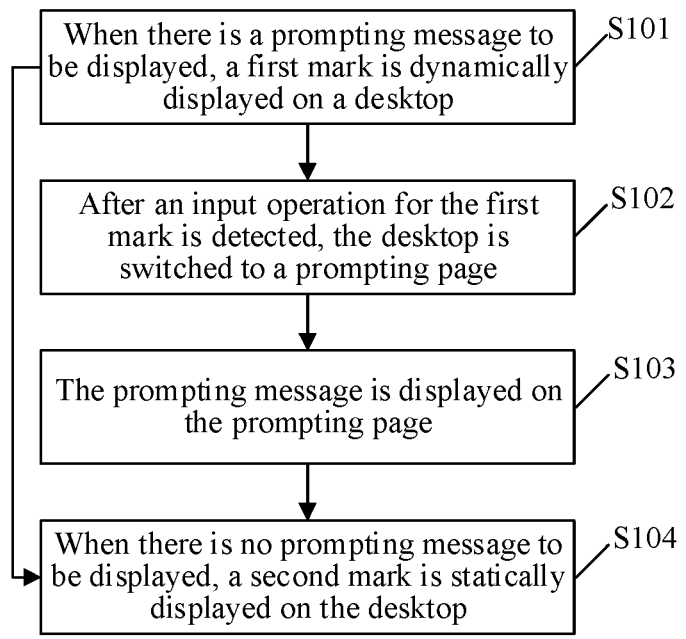
FIG. 1B is a flowchart illustrating a method for displaying a prompting message according to some embodiments of the present disclosure.

As shown in FIG. 1B, the method may further include the following operation.

In operation S104, when there is no prompting message to be displayed, a second mark is statically displayed on the desktop.

Here, the second mark may be the same as the first mark; or, the second mark may be different from the first mark.

Even though the second mark is the same as the first mark, the first mark is dynamically displayed while the second mark is statically displayed, so that the user may distinguish whether there is a prompting message needed to be viewed or not according to different display effects, i.e., dynamic displaying and static displaying.

In some embodiments, if S104 is executed after entering a prompting page and then exiting from the prompting page, it may be considered that there is no prompting message to be displayed, so that the second mark is statically displayed after the prompting page is switched back to the desktop.

In some other embodiments, when there are many prompting messages on the prompting page, since the prompting page is neither completely displayed under the first view nor swiped based on input of a user, not all prompting messages are displayed even though the user enters the prompting page, that is, there is still some prompting messages to be displayed even after exiting from the prompting page. In such case, it is still necessary to keep displaying the first mark or keep dynamically displaying the first mark. For example, the prompting page may be divided into multiple types.

One type is a communication message prompting page, a communication message including, but not limited to, a short message, an email and an instant message.

The other type is a service message prompting page, a service message including, but not limited to, express service, shopping service, calendar service and the like.

Since there are multiple prompting pages, different prompting pages have different position relationships with the desktop.

In some embodiments, a prompting page may correspond to a first mark and a second mark.

In some embodiments, the position relationship may also be determined according to a user setting. For example, a setting page may include a prompting page, and the position relationship may be set on the setting page.

In some embodiments, the operation that the display position of the first mark is determined according to the position relationship may include that: when the prompting page is on a predetermined side of the desktop, an edge of the predetermined side of the desktop is determined as the display position of the first mark, the predetermined side being the left side or right side of the desktop.

For example, the operation that the display position of the first mark is determined according to the position relationship may include at least one of the following operations:

when the prompting page is on the first side of the desktop, an edge of the first side of the desktop is determined as the display position of the first mark; or when the prompting page is on the second side of the desktop, an edge of the second side of the desktop is determined as the display position of the first mark, the second side being opposite to the first side.

In the embodiment, the prompting page may be on or the first mark and/or the second mark may be set on any two sides of the desktop.

In some embodiments, there may be one prompting page for displaying prompting messages of multiple applications.

In some embodiments, the method further may include that:

when a state of dynamically displaying the first mark meets a dynamic display stopping condition under a screen control strategy, the first mark is switched to be statically displayed, the form of the first mark is different from the form of the second mark.

In some embodiments, the first mark may be kept dynamically displayed, but for reducing power consumption, the first mark is not required to be kept dynamically displayed when it is determined that the user has been reminded. Therefore, when the display state of the first mark meets the dynamic display stopping condition under the screen control strategy, dynamic displaying of the first mark is stopped and the first mark is switched to be statically displayed.

For example, the number of times of extension and contraction of the first mark reaches a predetermined number of times. For example, a duration of dynamic displaying of the first mark reaches a preset duration.

However, the first mark and the second mark are different marks, and even though the first mark is not dynamically displayed. A user may determine that there is a prompting message to be displayed through the first mark different from the second mark.

In some embodiments, when the state of dynamically displaying the first mark meets the dynamic display stopping condition under the screen control strategy and the input operation for the first mark is not received, the first mark is statically displayed, In some embodiments, S101 further may include that:

when there is a prompting message to be displayed, the first mark is dynamically displayed on the desktop at an interval of a preset duration according to a dynamic display triggering condition under the screen control strategy.

In some embodiments, after displaying of the first mark is stopped, a prompting message to be displayed may also be continued to be generated, or, it is necessary to further remind the user of processing as soon as possible. In the embodiment, the first mark may be dynamically displayed again at the interval of the preset duration according to the dynamic display triggering condition under the screen control strategy. For example, the first mark is periodically dynamically displayed. In some other embodiments, the first mark is displayed at intervals of unequal durations.

In some embodiments, the method further may include that: when an event to be processed or a service situation update meeting the screen control strategy is detected, the prompting message to be displayed is generated.

The event to be processed may be an event to be processed determined according to input of a user in a calendar application or a note application, for example, a travel event, a meeting event or a phone event.

The service situation update may include price reduction of a specific commodity or service to be purchased in shopping service, etc.

In a word, in the embodiment, the event or service to be processed in the prompting message may be automatically set according to the input of a user or determined by an operating system or cloud service based on data analysis.

For example, if there is an account to which a user pays special attention in a social application, then a prompting message is generated only when there is a message coming from the account, rather than prompting messages to be displayed are generated in response to new messages sent from all accounts.

For another example, frequencies of using applications installed in the mobile terminal are different, prompting messages to be displayed on the prompting page are generated only when messages are pushed for the applications with the first N using frequencies, while, for messages which are pushed for the applications with using frequencies lower than the first N using frequencies, no prompting messages are generated.

Figure 5:
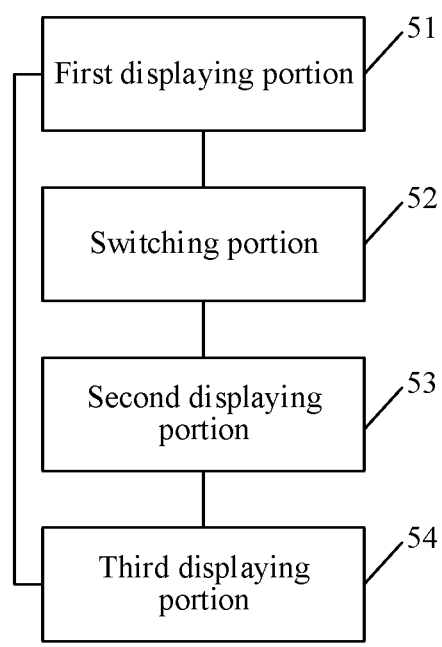
FIG. 5 is a structure diagram of a device for displaying a prompting message according to some embodiments of the present disclosure.

As shown in FIG. 5, some embodiments of the present disclosure provide a device for displaying a prompting message, which may include:

a first displaying portion 51, configured to, when there is a prompting message to be displayed, dynamically display a first mark on a desktop;

a switching portion 52, configured to, after an input operation for the first mark is detected, switch the desktop to a prompting page; and a second displaying portion 53, configured to display the prompting message on the prompting page.

In some embodiments, the first displaying portion 51, the switching portion 52 and the second displaying portion 53 may be program portions, and the program portions may be executed by a processor to implement the operations implemented by any abovementioned portion.

In some embodiments, the first displaying portion 51, the switching portion 52 and the second displaying portion 53 may be combined software and hardware portions, the combined software and hardware portions may include, but not limited to, various programmable arrays, and the programmable arrays may include a Field Programmable Gate Array (FPGA) or a complex programmable array.

In some other embodiments, the first displaying portion 51, the switching portion 52 and the second displaying portion 53 may include pure hardware portions such as an Application Specific Integrated Circuit (ASIC).

In some embodiments, the first displaying portion 51 is specifically configured to, when there is the prompting message to be displayed, make an extension and contraction change to the first mark on the desktop in a predetermined direction.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

In some embodiments, the predetermined direction may be: a first direction, the first direction being a direction from the prompting page to the desktop; or, a second direction, the second direction being a direction from the desktop to the prompting page.

When the extension and contraction change is made to the first mark in the first direction, the first mark may be displayed at an edge position of the desktop.

When the extension and contraction change is made to the first mark in the second direction, the first mark may be displayed in a middle region of the desktop.

In some embodiments, the prompting message may include prompting messages for one or more applications.

In some embodiments, the device further may include a third displaying portion 54, configured to, when there is no prompting message to be displayed, statically display a second mark on the desktop.

In some embodiments, the device further may include:

the first displaying portion 51, configured to, when a state of dynamically displaying the first mark meets a dynamic display stopping condition under a screen control strategy, stop dynamic displaying the first mark.

In some embodiments, the device further may include:

a generation portion, configured to, when an event to be processed or a service situation update meeting the screen control strategy is detected, generate the prompting message to be displayed.

Some examples will be provided below in combination with any abovementioned embodiment.

Example 1

A prompt of a new message is displayed on a main screen, the new message may be from a smart desktop assistant area (also referred to as "HiBoard" or "MinusOneScreenView") or new home, and the prompt plays a guiding role. For example, when the HiBoard is on a left side of the main screen, namely content of the HiBoard may be presented by sliding the main screen rightwards, the prompt of the new message in the HiBoard may be displayed at a left border of the screen to prompt that the message is from the HiBoard, thereby bringing convenience to the user for reading.

The prompt of the new message may be the first mark. The HiBoard and the new home are the prompting pages.

The prompt plays the guiding role, and may prompt the user how to operate the mobile terminal through directivity or a dynamic effect so as to switch the main screen of the mobile terminal from the desktop to the HiBoard or the new home.

Tools such as a smart phone assistant are set in the mobile terminal such as a mobile phone, and when a user is needed to process an event or there is a service situation update, a new situation is actively notified to the user, thereby improving timeliness of service and preventing the user from missing any important event.

Example 2

There is an icon of the HiBoard at a position of a sliding indicator of the desktop. When there is no update for the content of the HiBoard, the icon may be presented as a static icon. The position of the sliding indicator is one type of the first mark.

When there is an update for the content, the icon may be changed to a dynamic arrow to slide leftwards for three times. If a user does not timely enter the HiBoard, a left arrow is kept displayed and will be not changed back to the original static icon until the user enters the HiBoard.

A unified screen control strategy may be adopted for the content of the prompting message. For example, only an important message is prompted. If there are multiple prompts in a period time, prompting is made only once.

For example, when a state of service changes, a Content Provider (CP) may notify a client by broadcasting or pushing a message, and the client, after receiving the message, may control a sliding indicator on the desktop through a controller to change a static icon into a dynamic left arrow.

After the user enters the HiBoard, the left arrow is reset as the static icon, and when a prompting message is received next time, the static icon is changed back to the dynamic left arrow.

For example, in a case that a user has a meeting 15 minutes later, or that an express is being distributed or that price of a commodity in a shopping cart is reduced, a small arrow may be presented at a leftmost position at the sliding indicator in the first view of the desktop and slides leftwards for three times to prompt the user, and the user, after receiving such a prompt, enters the HiBoard. In such case, a service card may be presented if there is an update, and meanwhile, a text is also presented in the display region. Therefore, timeliness of service information is ensured, and important information, if updated, can reach the user in the first time.

Under some circumstances, there is a bottom board, with three letters "new situation" appearing when there is a prompt thereon, on a leftmost side of the desktop at middle positions of folders in a first row and the dock bar of the desktop. The "new situation" is another type of the first mark.

Some embodiments of the present disclosure provide a mobile terminal, which may include:

a display, configured for displaying;

a processor; and a memory configured to store an instruction executable for the processor, wherein the processor is configured to execute the executable instruction to control displaying of the display, and may execute the method for displaying a prompting message provided in any abovementioned technical solution.

The display may be any display screen, for example, a Liquid Crystal Display (LCD) screen, an Organic Light-Emitting Diode (OLED) display screen, an electronic ink display screen or a projection display screen.

The processor may be any device with an information processing function, for example, a Central Processing Unit (CPU), a microprocessor, a Digital Signal Processor (DSP), a programmable array or an ASIC.

The processor may be connected with the display and the memory through a bus (for example, an integrated circuit bus or a peripheral connecting bus).

The memory may include, but not limited to, a device including a storage medium, for example, a Read-Only Memory (ROM) or a flash memory.

The mobile terminal may include, but not limited to, a mobile phone, a pad or a wearable device, etc.

Figure 6:
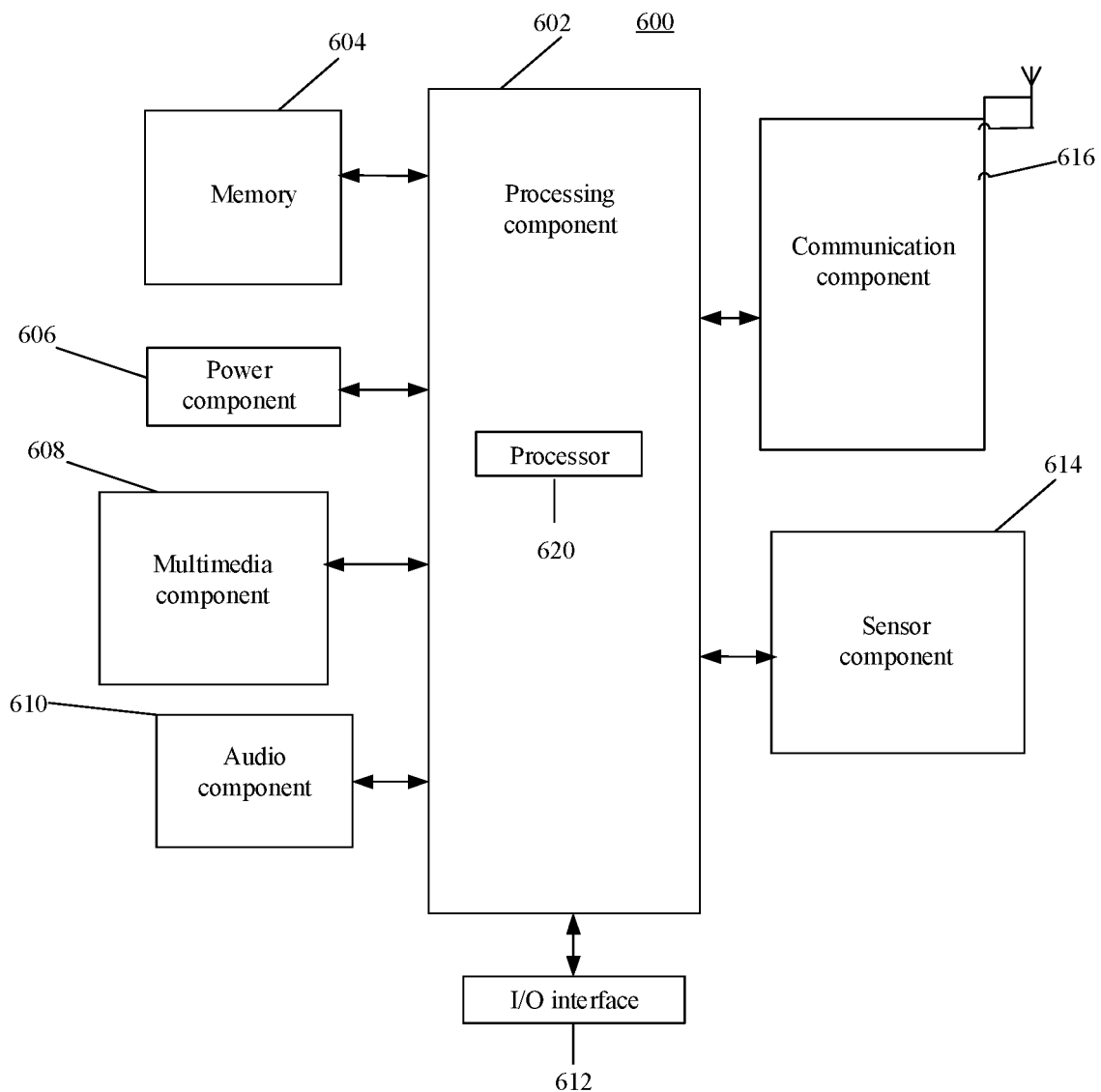
FIG. 6 is a structure diagram of a mobile terminal according to some embodiments of the present disclosure.

FIG. 6 is a block diagram of a terminal 600 according to some embodiments of the present disclosure. For example, the terminal 600 may be a mobile phone, a computer, a digital broadcast terminal, a messaging device, a gaming console, a tablet, a medical device, exercise equipment, a personal digital assistant and the like.

Referring to FIG. 6, the terminal 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically is configured to control overall operations of the terminal 600, such as the operations associated with display, telephone calls, data communications, camera operations, and recording operations. The processing component 602 may include one or more processors 620 to execute instructions to perform all or part of the operations in the abovementioned method. Moreover, the processing component 602 may include one or more portions which facilitate interaction between the processing component 602 and the other components. For instance, the processing component 602 may include a multimedia portion to facilitate interaction between the multimedia component 608 and the processing component 602.

The memory 604 is configured to store various types of data to support the operation of the device 600. Examples of such data include instructions for any application programs or methods operated on the terminal 600, contact data, phonebook data, messages, pictures, video, etc. The memory 604 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 is configured to provide power for various components of the terminal 600. The power component 606 may include a power management system, one or more power supplies, and other components associated with generation, management and distribution of power for the terminal 600.

The multimedia component 608 may include a screen providing an output interface between the terminal 600 and a user. In some embodiments, the screen may include an LCD and a Touch Panel (TP). In some embodiments, organic light-emitting diode (OLED) or other types of displays can be employed.

If the screen includes the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 608 may include a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 may include a Microphone (MIC), and the MIC is configured to receive an external audio signal when the terminal 600 is in the operation mode, such as a call mode, a recording mode and a voice recognition mode. The received audio signal may further be stored in the memory 604 or sent through the communication component 616. In some embodiments, the audio component 610 further may include a speaker configured to output the audio signal.

The I/O interface 612 is configured to provide an interface between the processing component 602 and a peripheral interface module, and the peripheral interface module may be a keyboard, a click wheel, a button and the like. The button may include, but not limited to: a home button, a volume button, a starting button and a locking button.

The sensor component 614 may include one or more sensors configured to provide status assessment in various aspects for the terminal 600. For instance, the sensor component 614 may detect an on/off status of the device 600 and relative positioning of components, such as a display and small keyboard of the terminal 600, and the sensor component 614 may further detect a change in a position of the terminal 600 or a component of the terminal 600, presence or absence of contact between the user and the terminal 600, orientation or acceleration/deceleration of the terminal 600 and a change in temperature of the terminal 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging APP. In some embodiments, the sensor component 614 may also include an acceleration sensor, a gyroscope sensor, a magnetic sensor, a pressure sensor or a temperature sensor.

The communication component 616 is configured to facilitate wired or wireless communication between the terminal 600 and other equipment. The terminal 600 may access a communication-standard-based wireless network, such as a Wireless Fidelity (Wi-Fi) network, a $2^{nd}$-Generation (2G), $3^{rd}$-Generation (3G), $4^{th}$-Generation (4G), or $5^{th}$-Generation (5G) network or a combination thereof. In some embodiments, the communication component 616 receives a broadcast signal or broadcast associated information from an external broadcast management system through a broadcast channel. In some embodiments, the communication component 616 further may include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments, the terminal 600 may be implemented by one or more ASICs, DSPs, Digital Signal Processing Devices (DSPDs), Programmable Logic Devices (PLDs), FPGAs, controllers, micro-controllers, microprocessors or other electronic components, and is configured to execute the abovementioned method.

In some embodiments, there is also provided a non-transitory computer-readable storage medium having stored an instruction thereon, such as the memory 604 including an instruction, and the instruction may be executed by the processor 620 of the terminal 600 to implement the abovementioned method. For example, the non-transitory computer-readable storage medium may be a ROM, a Compact Disc Read-Only Memory (CD-ROM), a magnetic tape, a floppy disc, an optical data storage device and the like.

Various embodiments of the present disclosure can have one or more of the following advantages.

When there is a prompting message to be displayed, a first mark is dynamically displayed on a desktop. On the first aspect, a prompting page is entered after an input operation for the first mark is detected, and then each prompting message to be displayed may be displayed on the prompting page and may be seen without switching to each application, which, compared with direct displaying at each application icon, can simplify user operations. On the second aspect, the first mark is dynamically displayed on the desktop, so that a good prompting effect may be achieved through a dynamic effect. On the third aspect, the first mark is displayed on the desktop, which is equivalent to notifying a user of the prompting message to be displayed, thereby reducing missed prompting messages, avoiding the condition in the related art that a user is required to enter a system message page to know about whether there is a prompting message to be viewed or not, and further improving a user experience.

A non-transitory computer-readable storage medium can have instructions stored thereon for execution by a processor of a mobile terminal to enable the mobile terminal to implement the operations of the abovementioned methods for displaying a prompting message, such as the methods shown in the figures.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for displaying a prompting message, comprising:
    upon there is a prompting message to be displayed, dynamically displaying a first mark on a desktop;
    after an input operation for the first mark is detected, switching the desktop to a prompting page; and
    displaying the prompting message on the prompting page,
    wherein dynamically displaying the first mark on the desktop comprises:
    automatically making an extension and contraction change to a display length of the first mark on the desktop in a predetermined direction; and
    displaying the first mark on the desktop dynamically and periodically, wherein the predetermined direction is:
a first direction, which is a sliding direction of a sliding operation of triggering an electronic device to switch from the desktop to the prompting page; or,
a second direction, which is a sliding direction of a sliding operation of triggering an electronic device to switch from the prompting page to the desktop,
wherein, when the extension and contraction change is made to the first mark in the first direction, the first mark is displayed at an edge position of the desktop or in a middle region of the desktop.

2. The method of claim 1, further comprising:
upon there is no prompting message to be displayed, statically displaying a second mark on the desktop.

3. A mobile phone implementing the method of claim 1, wherein the mobile phone comprises a display screen configured to display the prompting message on the prompting page to be viewable to a user without switching to each application, thereby simplifying user operation; and wherein the mobile phone is configured to notify the user of the prompting message by displaying the first mark on the desktop without user intervention.

4. The method of claim 1, wherein the prompting message comprises at least one of a calendar prompt, an email prompt, or an instant message prompt.

5. A device for displaying a prompting message, comprising:
a processor; and
a memory configured to store an instruction executable for the processor,
wherein the processor is configured to:
upon there is a prompting message to be displayed, control dynamically displaying of a first mark on a desktop;
after an input operation for the first mark is detected, switch the desktop to a prompting page; and
control displaying of the prompting message on the prompting page,
wherein the processor, when controlling dynamically displaying of the first mark on the desktop, is specifically configured to:
automatically control making of an extension and contraction change to a display length of the first mark on the desktop in a predetermined direction; and
control periodically dynamically displaying the first mark on the desktop,
wherein the predetermined direction is:
a first direction, which is a sliding direction of a sliding operation of triggering an electronic device to switch from the desktop to the prompting page; or,
a second direction, which is a sliding direction of a sliding operation of triggering an electronic device to switch from the prompting page to the desktop,
wherein, when the extension and contraction change is made to the first mark in the first direction, the first mark is displayed at an edge position of the desktop or in a middle region of the desktop.

6. The device of claim 5, wherein the processor is further configured to:
upon there is no prompting message to be displayed, control static displaying of a second mark on the desktop.

7. The device of claim 6, wherein the processor is further configured to:
upon a state of dynamically displaying the first mark meets a dynamic display stopping condition under a screen control strategy, control stopping of dynamical displaying of the first mark.

8. The device of claim 6, wherein the processor is further configured to:
upon an event to be processed or a service situation update meeting a screen control strategy is detected, generate the prompting message to be displayed.

9. The device of claim 5, wherein the prompting message comprises prompting messages for one or more applications.

10. The device of claim 9, wherein the processor is further configured to:
upon a state of dynamically displaying the first mark meets a dynamic display stopping condition under a screen control strategy, control stopping of dynamical displaying of the first mark.

11. The device of claim 5, wherein the processor is further configured to:
upon a state of dynamically displaying the first mark meets a dynamic display stopping condition under a screen control strategy, control stopping of dynamical displaying of the first mark.

12. The device of claim 11, wherein the processor is configured to, upon there is the prompting message to be displayed, control dynamical displaying of the first mark on the desktop at an interval of a preset duration according to a dynamic display triggering condition under the screen control strategy.

13. The device of claim 5, wherein the processor is further configured to:
upon a state of dynamically displaying the first mark meets a dynamic display stopping condition under a screen control strategy, control stopping of dynamical displaying of the first mark.

14. The device of claim 13, wherein the processor is configured to, upon there is the prompting message to be displayed, control dynamical displaying of the first mark on the desktop at an interval of a preset duration according to a dynamic display triggering condition under the screen control strategy.

15. The device of claim 5, wherein the processor is further configured to:
upon an event to be processed or a service situation update meeting a screen control strategy is detected, generate the prompting message to be displayed.

16. The device of claim 5, wherein the processor is further configured to:
upon an event to be processed or a service situation update meeting a screen control strategy is detected, generate the prompting message to be displayed.

17. The device of claim 5, wherein the prompting message comprises at least one of a calendar prompt, an email prompt, or an instant message prompt.

18. A non-transitory computer-readable storage medium having instructions stored thereon, for execution by a processor of a mobile terminal to enable the mobile terminal to implement operations of a method for displaying a prompting message, comprising:
upon there is a prompting message to be displayed, dynamically displaying a first mark on a desktop;
after an input operation for the first mark is detected, switching the desktop to a prompting page; and
displaying the prompting message on the prompting page,
wherein dynamically displaying the first mark on the desktop comprises:
automatically making an extension and contraction change to a display length of the first mark on the desktop in a predetermined direction; and displaying the first mark on the desktop dynamically and periodically, wherein the predetermined direction is:

a first direction, which is a sliding direction of a sliding operation of triggering an electronic device to switch from the desktop to the prompting page; or, a second direction, which is a sliding direction of a sliding operation of triggering an electronic device to switch from the prompting page to the desktop, wherein, when the extension and contraction change is made to the first mark in the first direction, the first mark is displayed at an edge position of the desktop or in a middle region of the desktop.

* * * * *